A. H. BALLARD.
APPARATUS FOR BAKING.
APPLICATION FILED OCT. 21, 1921.

1,434,035.

Patented Oct. 31, 1922.
3 SHEETS—SHEET 2.

Patented Oct. 31, 1922.

1,434,035

UNITED STATES PATENT OFFICE.

ARTHUR H. BALLARD, OF BOSTON, MASSACHUSETTS, ASSIGNOR TO BALLARD OVEN CORPORATION, OF BOSTON, MASSACHUSETTS, A CORPORATION OF MASSACHUSETTS.

APPARATUS FOR BAKING.

Application filed October 21, 1921. Serial No. 509,320.

*To all whom it may concern:*

Be it known that I, ARTHUR H. BALLARD, a citizen of the United States, and a resident of Boston, county of Suffolk, State of Massachusetts, have invented an Improvement in Apparatus for Baking, of which the following description, in connection with the accompanying drawings, is a specification, like characters on the drawings representing like parts.

This invention consists in apparatus for baking, one object being to provide in a relatively small, condensed space a baking oven of the continuous type having a large capacity and capable of being used with liquid or other fuel and particularly fuel such as liquid hydrocarbon yielding high temperature products of combustion.

For illustrative purposes the invention is herein shown as embodied in a bread baking oven of relatively small dimensions and covering a relatively small superficial area, but provided with a traveling conveyor of large capacity on which the loaves are conveyed into, through and out of the oven, the length of the conveyor exposed to the heat of the oven being relatively great as compared to the superficial area covered by the oven. In the illustrated form of oven indirect heating is utilized, that is to say, the products of combustion are kept out of direct contact with the material which is conveyed through the oven for baking, but are employed to heat properly located, highly conductive radiating surfaces of adequate area so arranged with relation to the combustion chamber that the high temperature products of combustion may be conveyed to them by direct paths and be suitably diffused or distributed thereover to effectively heat the oven at the required temperature and properly apply the heat to the bread traveling through the same on the conveyor.

The invention will be best understood by reference to the following description when taken in connection with the accompanying illustration of one specific embodiment of the apparatus, while its scope will be more particularly pointed out in the appended claims.

Referring to the drawings and to the embodiment of the invention therein illustrated, the baking chamber of the oven is contained within a structure which is herein shown as erected on a masonry setting 11 (Figs. 1 and 2) within which setting is located the combustion chamber. The oven structure is composed of horizontal and vertical frame members 13 which may be of structural steel and provide support on the four sides and top for heat insulating walls. Herein such walls are constructed (Fig. 2) by providing a series of inner panels 15 and outer panels 17 formed of sheet metal with an intermediate insulating filling 19 of any suitable material or materials, such as asbestos or the like. The bottom of the baking chamber is formed by the metallic floor plate 21 separating the chamber from the heating chamber below but serving as a highly conductive radiating surface to transmit upwardly to the baking space the heat received from the products of combustion. The walls, if desired, may be so constructed as to leave door spaces 20 and one or more window spaces 24 so that access to the oven may be had for purposes of inspection or repairs and the condition of the trays and their contents may be examined from time to time.

Figure 1:
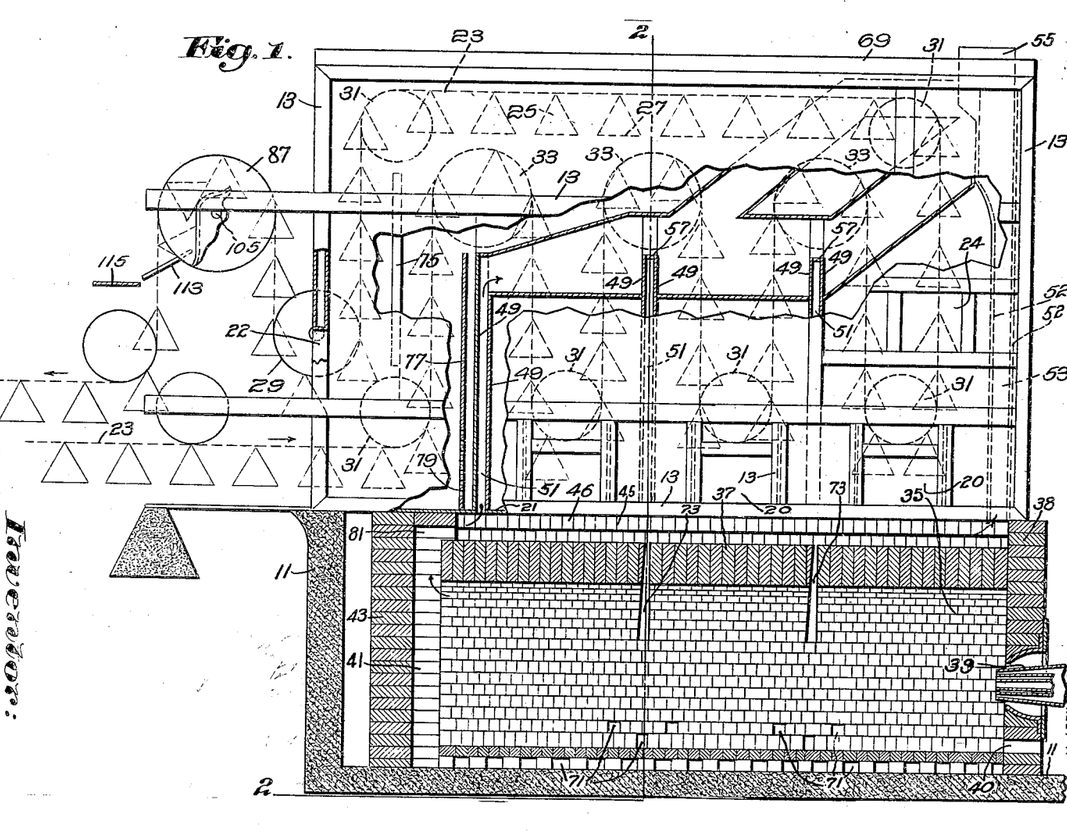
Fig. 1 is a side elevation, partly in section, of an oven embodying one form of the invention, that portion of the conveyor external to the oven itself being shown only in part.

The oven chamber is preferably closed against the escape of heat except where provision is made for the entrance and exit of the traveling conveyor, this being provided for in the present oven by cutting away the lower part of the front wall of the oven, as indicated in Fig. 1, leaving an opening 22 of sufficient size to permit the passage of the conveyor into the oven through the lower part of the opening and the exit of the conveyor therefrom through the upper part of the opening. As hereinafter described, suitable provision is made at this entrance-exit opening to oppose the escape of heat therethrough.

The traveling conveyor may be of any suitable construction, but herein consists of a pair of chains 23, to each of which are jointed at suitably separated intervals depending supports 25, there being sustained between each pair of supports a carrier tray 27 serving to hold the pans or other receptacles in which the individual loaves of bread or other materials to be baked are carried through the oven. The detail construction of the trays and the pans will be hereinafter more fully described.

The conveyor chains may be driven at any suitable point, as by the driving sprockets 87 located at the exit end of the oven chamber, any suitable driving power being utilized, as, for example, a motor and gearing (not shown) designed to give the required rate of feed to the conveyor. The sprocket chains are guided at suitable intervals within the oven by guiding sprockets 31 journaled on the inner walls of the oven chamber and so located as to guide the conveyor in a circuitous path which doubles or returns on itself preferably a number of times, so as to expose within the relatively small space of the baking chamber a considerable length of conveyor.

Referring to Fig. 1, it will be seen that the conveyor enters the oven chamber in a horizontal path through the opening 22 at the bottom thereof, passing around the guiding sprockets 31, and is then directed into a vertical path. As it passes over a pair of larger guiding sprockets 33 near the upper part of the chamber it takes a vertical downward path until it reaches the bottom of the chamber, whereupon it passes over another pair of guiding sprockets 31 and again assumes an upward path. This is repeated a number of times until the length of the baking chamber has been traversed, whereupon the conveyor engages the guiding sprockets 31 near the top of the oven and is directed in a substantially horizontal path near the top of the oven back to the forward end thereof and thence down and out of the entrance-exit opening 22. Each carrier tray, being suspended from a point above its center of gravity, maintains the same upright position at all times irrespective of the direction of travel of the conveyor. Guide supports to engage the ends of the trays or the chains themselves, in the form of fixed guiding rolls (not shown) at the sides of the baking chamber, or any other suitable means, may be employed to prevent the carrier from sagging in its upper horizontal path under the weight of the bread. The conveyor may also have any ordinary or usual devices (not shown) for maintaining suitable tension in the sprocket chains and to offset the expansion which takes place when the oven is heated.

Referring now to the generation of heat and the provisions for applying heat to the bread as it is conveyed through the baking chamber, the combustion chamber 35 is enclosed by refractory walls being herein formed by the brick arch 37. The rear end of the combustion chamber is closed by the refractory wall 38 having one or more air admission passages 40 and having also projecting through it and into the combustion chamber the crude oil burner 39 which may be of any usual or ordinary type, and provided with well known devices (not shown) for varying the relative supply of air and oil and regulating the temperature to the requirements of the materials being baked. The opposite end of the combustion chamber opens into a combustion space 41 formed by the bridge wall 43 and opening into the heating chamber 45 above the arch 37 and directly beneath the oven floor 21. The sides of the heating chamber 45 are formed (Fig. 2) by the refractory walls 46 on the top of which rests the floor 21.

By providing a separate combustion chamber with refractory enclosing walls, the high temperature products of combustion may be generated and the combustion completed before reaching the radiating surfaces, and a uniform distribution of the heated gases to the radiating surfaces may be provided for. At the same time the location of the combustion chamber beneath the baking chamber permits the ascending radiation from the combustion chamber to be availed of in raising the heat of the baking chamber. The effective application of the heat of combustion to the baking chamber is also increased by the provision of the flue or heating chamber 45 between the combustion chamber and the baking chamber, provided, as it is, with the metallic radiating surface 21 underlying the conveyor through which the heat of the products of combustion received from the combustion chamber is effectively transmitted to the baking chamber in an ascending path.

The substantially flat baking chamber floor 21 provides a radiating surface which underlies the conveyor and the baking space, where it is most effective both for efficient application and uniform distribution of the heat. The circuitous path of the conveyor, however, so increases its carrying capacity in proportion to the size of the baking space, and so increases the amount of material which is presented for the absorption of heat, that the aggregate area of the radiating surface should be substantially greater than the superficial area of the space occupied by the baking chamber.

An amplified radiating surface may be provided in various ways while still preserving a substantial underlying radiating area, but in the illustrative embodiment of the invention herein I have provided the same in the form of pairs of sheet metal partition walls 49 of high heat conductivity which extend transversely across the oven chamber, preferably from side to side, having communication through the floor 21 with the heating space 45 and at the top with a system of flues to be described, such partition walls thereby providing upright heating or flue chambers 51 which are distributed throughout the length of the baking chamber and are so related to the conveyor as to most effectively direct the heat against the bread traveling therethrough. Three such chambers intermediate the ends are herein provided, as indicated in Fig. 1, located beneath the respective guide sprocket wheels 33 so as to stand between the tiers of upwardly and downwardly moving trays. At the rear end of the oven there is also provided a flue or heating space 53 formed between transverse partition walls 52 and adapted to carry the products of combustion from the rear of the heating chamber 45 upwardly and out of the baking chamber through a pair of flue exits 55 at the top thereof. The transverse partition walls 52 are preferably of metal and serve as additional radiating surfaces.

The construction of each upright transverse heating or flue chamber 51 will be seen from Figs. 1 to 4 inclusive, where details of the second one of the series are shown. The two partition walls 49 extend transversely across between the side walls of the oven chamber forming the heating or flue chamber 51 which is closed at the top by the plate 57 and at the ends by plates 58, leaving a space above the chamber 51 sufficient to permit the passage of the conveyor over the same.

It will be seen that the several intermediate heating chambers 51 and end chamber 53, together with the exit flues, are formed by walls which are separate from the insulating side walls of the oven itself so that the structure of the baking chamber in effect is built around the described flue system, thereby providing a system of flues within the baking chamber space and presenting radiating surfaces which have a maximum heating effect.

Admission of the products of combustion from the heating chamber 45 to the flue or heating chamber 51 (see Fig. 2) takes place through an opening in the floor 21 which provides a throat or passage 59 leading into the upright flue chambers and extending across the heating chamber 45 between the refractory walls 46. To insure uniform distribution, the chamber 51 is provided with a series of transverse baffles 61 which may be of any suitable construction, but herein (Figs. 3 and 4) comprise sleeves supported by bolts 63 fastened to opposite plates 49 and passing through the flue chamber. The baffles 61, which are arranged in two upwardly converging sets, are so located and spaced with reference to the exit openings 65 from the flue chambers that they compel the products of combustion entering the passage 59 to distribute themselves throughout the entire space of the flue chamber and heat each radiating surface 49 uniformly but without an excessive heat at any one part thereof.

Exit openings 65 are provided each side of each flue chamber and communicate with a system of flues 67, also preferably of metal to present additional radiating surfaces, extending along opposite sides of the oven where they do not interfere with the passage of the bread trays carried by the conveyor. These latter flues 67 communicate in succession with the succeeding flue chambers 51 and convey the products of combustion into the back flue chamber 53 at the back of the oven chamber. The cross sectional area of the flues 67 preferably undergoes a gradual enlargement as they pass successive upright flue chambers. In the illustrated embodiment of the invention, auxiliary branch flues 69 are provided to further increase the capacity of these exit flues.

The path provided for the products of combustion and the arrangement of the radiating surfaces will now be clear. In the heating chamber 45, products of completed combustion emerging from the combustion chamber are brought in contact with the radiating floor surface 21, which latter absorbs a part of the heat and radiates it into the bottom of the oven where it meets the upwardly and downwardly moving sets of bread pans. At the first upright heating chamber 51 a portion of the products of combustion are diverted into a vertical path through the throat 59 and pass into that chamber, and the same thing takes place at the open throat of each successive upright flue chamber. The balance of the products of combustion pass along the bottom of the floor 21 to the rear end of the heating chamber 45, whence they pass into the end or rear vertical flue 53 and ascending vertically pass out of the oven through the exits 55. In each upright flue chamber the hot gases entering the throat 59 (Fig. 2) travel up toward the two horizontal flues 67 at the side of the oven which they enter through the opening 65, but, owing to the arrangement of baffles 61, in so doing, they are spread and distributed so that they are brought in contact with substantially every part of each radiating plate 49 and the two plates are thereby heated uniformly and without tendency to have their lower or any other portions overheated.

To apply the high temperature products of combustion directly to the radiating surfaces from the combustion chamber while at the same time to distribute them uniformly without overheating, the combustion chamber 35 is preferably tapped at intervals throughout its length to cause a more uniform distribution of the hot gases therein than would be afforded were they all compelled to pass through the combustion space 41.

Figures 2, 3, 4:
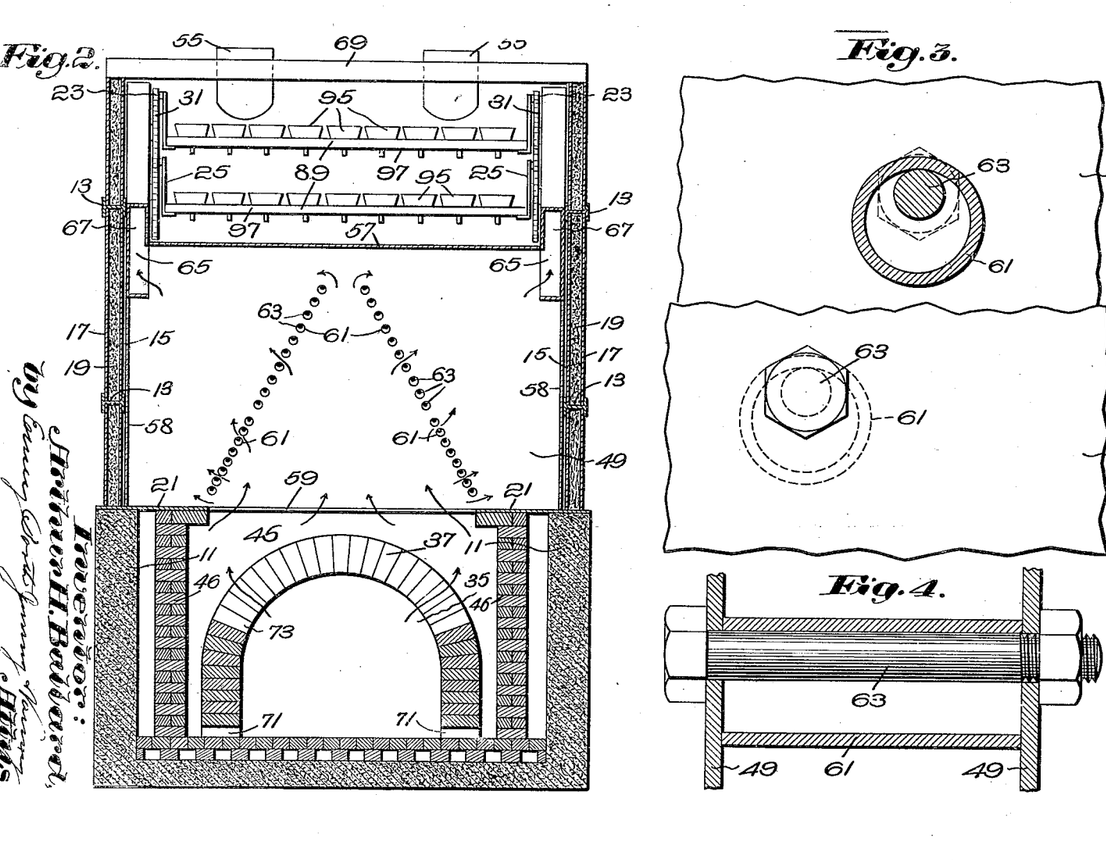
Fig. 2 is a transverse sectional elevation on the line 2—2 in Fig. 1.
Fig. 3 is a detail elevation showing the construction of the baffle members in the vertical flue chambers.
Fig. 4 is a sectional elevation taken through one of the baffle members.

Any suitable arrangement of exit passages may be provided, but herein the arch is provided not only with lateral distributing openings 71 (Fig. 1) but is also provided with elongated slotted ports 73 which are located approximately beneath the second and third rear flue chambers 51 and provide suitable exit openings for the gases to feed these chambers with the products of combustion direct from the combustion chamber. Herein the ports 73 extend entirely across the crown of the arch, as indicated in Figs. 1 and 2, but are preferably gradually narrowed as the top of the arch is approached, as shown in Fig. 1. This reduces the cross sectional area of the port at the top of the combustion chamber and insures a more uniform distribution of the high temperature products of combustion to the various radiating surfaces which are utilized to distribute the heat to the oven.

It will be seen that the bread pans carried by the conveyor, after entering the oven, pass over the first pair of guiding sprockets 33, whereupon the material to be baked is brought into close proximity to the rear radiating wall 49 of the first upright heating chamber 51 approaching all the time the floor radiating surface 21. On assuming an upward path of travel they are then brought into proximity to the front radiating wall 49 of the second upright chamber 51, next into proximity with the rear wall thereof, and so on until the entire length of the oven has been traversed. In their return path and before withdrawal they are carried the entire length of the oven near the top thereof, which is heated by the ascending currents of air from all the lower radiating surfaces.

In dealing with high temperature products of combustion, such as are produced by burning crude oil, in order to indirectly heat the baking chamber efficiently and effectively, it is desirable to employ radiating surfaces of relatively great aggregate area and to so apply the products of combustion to the heating thereof that they reach the radiating surfaces by relatively direct paths from the combustion chamber and that they undergo a suitable distribution and diffusion over the radiating surfaces so as to secure a uniform heating thereof without excessive concentration of the heat on any one portion of the radiating surfaces. By the described arrangement the radiating surface of a relatively small oven can be increased to secure an efficient transfer of heat, and the high temperature gases resulting from the combustion of the hydrocarbon fuel can be effectively applied to heat the oven and the heat thereof uniformly distributed without excessive heat in any one part thereof.

The relatively great metallic radiating surfaces contacting with the products of combustion in the heat distributing space or spaces provide radiating walls of high conductivity capable of being quickly heated and quickly cooled, so that the oven may be started up when cold or cooled down when stopped in a minimum of time. The products of combustion are generated in the combustion chamber which protects the radiating surfaces from excessive heat. On the other hand, they are applied directly and effectively to the radiating surfaces without waste of heat in transmission and quickly diffused and distributed over a wide area of radiating surface by the arrangement of ports in the heating chamber. It will be observed that the general distribution of the products of combustion is upward out of the combustion chamber to the bottom of the baking chamber, and thence upward through the interior flues arranged in close proximity to the carrier, thence horizontally and upward through the top of the baking chamber, this taking place through multiple paths which provide for the direct but relatively uniform and effective application of the heat from the combustion chamber to the radiating surfaces of the baking chamber.

Referring to the front of the oven and the entrance-exit opening for the conveyor, I have made provision to minimize the heat loss and oppose the escape of hot gases therefrom. Referring more particularly to Fig. 1, there is preferably provided a vertical partition wall or baffle plate 75 which preferably extends entirely across the oven located between the ascending line of trays on the entering line of the conveyor and the descending line of trays on the departing line thereof. The descending line of trays moves in close proximity on one side of the partition wall 75 and in close proximity on the other side to the oven wall 13. The ascending line of trays moves in close proximity on one side to the partition wall 75 and in close proximity on the other side to a second baffle plate or partition wall 77, also extending across the oven and resting on the oven floor. The partition wall 77 is preferably located slightly in front of the adjacent radiating plate 49 of the first flue chamber 51, so that it prevents the heat radiated therefrom from passing out of the entrance-exit opening 22. The lower part of the plate 77 may be provided, if desired, with a series of ports or openings 79 which will effect an upward draft carrying the heated air between the baffle 77 and the radiating plate 49 upward into the oven where it becomes effective to heat the contents thereof. In front of the baffle plate 77 the floor plate 21 rests upon the brick bridge wall 43 and adjoining brick work 81, so that unnecessary waste of radiated heat from the floor to the entrance-exit opening is prevented. The adjoining brick work 81 provides an arch-shaped opening encircling the end of the arch-shaped combustion chamber through which the gases pass from the combustion space 41 into the heating chamber 45.

It will be observed that the arrangement of the baffle plate 77 and the partition wall 75 provides entrance and exit passages respectively for the entering and departing trays, such that the latter substantially close these passages against escape of any substantial amount of heated air through them. The travel of the trays in the oven is relatively slow and deliberate, so that the air trapped between them and carried into or out of the oven is of little consequence, and the vertical position of the entrance and exit passages, combined with the location of the entrance-exit opening 22 at the lowermost part of the oven where it is protected also by the baffle 77, further assists in opposing leakage due to the natural tendency of heated air to rise to the top of the oven. The trays themselves, therefore, act as closures to close the vertical entrance and exit passages against the escape of hot air and thereby minimize the heat loss which would otherwise be due to the use of an endless and continuously movable traveling conveyor. By causing the trays to enter and leave at the same end of the oven any tendency of the departing trays to start an outward draft of the heated air from the top of the oven through the downward movement of the trays is opposed by the opposite movement of the entering trays.

Figure 5:
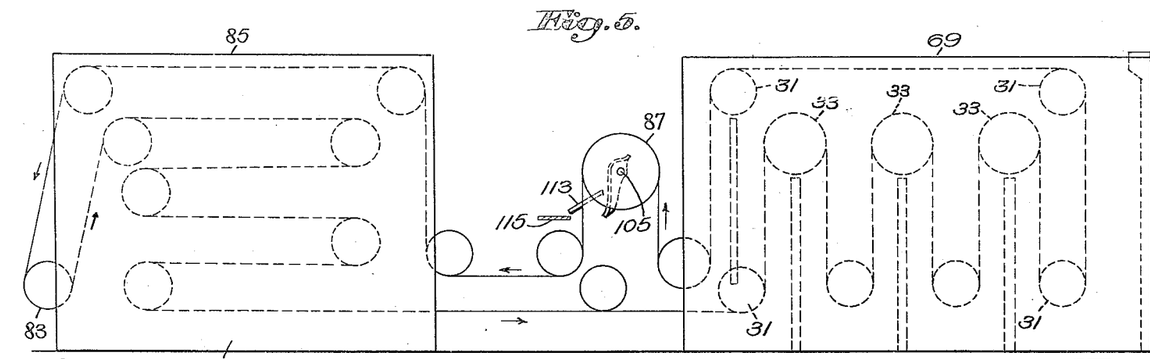
Fig. 5 is a diagrammatic view showing the path of the conveyor in its relation to the baking oven and the tempering oven.
Figure 6:
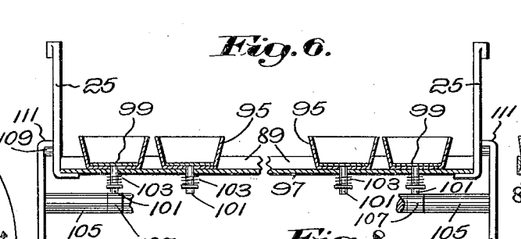
Fig. 6 is a sectional elevation taken through one of the carrying trays.
Figure 7:
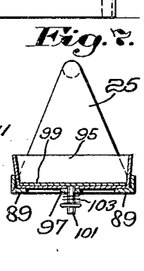
Fig. 7 is a transverse sectional elevation taken through the carrier.
Figure 8:
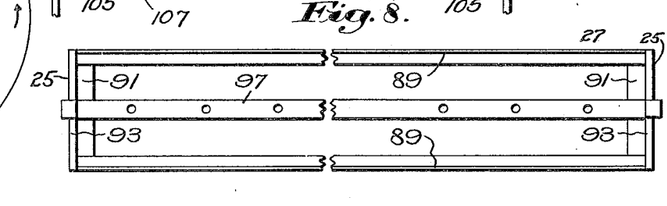
Fig. 8 is a plan view of one of the carrying trays.
Figure 9:
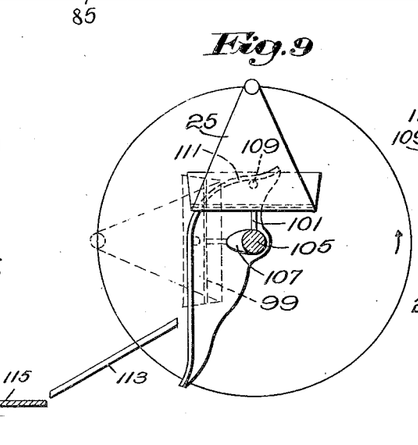
Fig. 9 illustrates the details of the bread discharging device.

In Fig. 5 I have shown, more or less diagrammatically, the general arrangement of the oven and its conveyor with relation to the loading and discharging points when the oven is used for baking bread. The trays are loaded at any desired point, as for example 83, preferably by machinery, the character of which is well known and understood. The conveyor may then carry the pans into the usual tempering or fermenting oven 85, which is maintained at a moderate temperature, wherein the bread is subjected to the usual tempering action. After more or less extended travel through the tempering oven, it passes through the entrance opening 22 of the baking oven where it is subjected to the baking operation already described. On its emergence from the baking oven the conveyor, after passing around the guiding sprockets 29, passes to the guiding sprocket 87 and thence over suitable guiding sprockets back to the initial point of charge.

Preferably the action is rendered more automatic by the provision of suitable discharging appliances between the baking oven and the charging point, as, for example, at the sprocket wheels 87. For this purpose automatic discharging devices are provided which are constructed to cooperate with specially arranged pans.

Referring to Figs. 6 to 9 inclusive, each supporting tray 27 comprises the angle irons 89 connected at opposite ends by the transverse members 91, each end supported by the end supporting member 25 pivotally connected to the sprocket chain carrier. The pans 95 are supported at opposite ends by the angle irons 89 and also have an intermediate support comprising the strap or plate 97 extending midway beneath the bottoms of the pans. Each pan in addition to its fixed bottom, is provided with a false bottom 99 having a pin 101 secured thereto and extending through the fixed bottom and the strap 97, and presenting an end projecting below the latter. A spring 103 interposed between a collar on the pin and the bottom of the strap normally holds the false bottom of the pan down against the fixed bottom, but, if pressure is applied to the bottom of the pin it will serve to lift the false bottom together with any material resting on the same.

The sprocket wheels 87 are journaled to turn loosely upon a fixed shaft 105 and the latter carries at separated intervals cams 107 located within the paths of the respective pins 101 on the trays. As the conveyor passes over the sprocket wheels 87 and reaches the uppermost position represented in full lines in Fig. 9, a pin 109 projecting laterally from each end support 25 is caused to engage the under edge of a track cam 111 presenting an arc-shaped path to the pin, each track cam being fixed on the shaft 105. As the tray advances it is thereby constrained to move from the full line position to the dotted line position shown, and at the same time each pin 101 traveling over the edge of its correlated cam 107 is forced inward, thereby lifting the false bottom 99 and dislodging and expelling the baked loaf from the pan. The loaves which are thus pushed out of the bottom of their respective pans, as the latter are tilted on the sides, are allowed to gravitate down an inclined chute 113, whence they may be conveyed, as by the underlying transversely traveling conveyor belt 115, to any suitable point of delivery. The entire operation of discharging the baked bread from the trays and conveying it away from the oven can thus be performed automatically.

The provision of the vertical entrance passage for the conveyor which is substantially closed at all times by one or more trays, and the provision of the baffle plate 77 not only prevent the loss of heat but increase the sharpness or the suddenness of the first heating effect of the oven securing the effect of a flash heat which is effective to form a crust over the outside of the bread before it has been subjected for any substantial time to the baking operation. Thus the loaf as it enters the oven is kept comparatively cool until about the time it emerges from the vertical entrance passage, after which it is quickly and without substantial loss of time brought into close proximity to the highly heated radiating surface 49 with the effect of forming a thin, hard outer crust. The hard crust, which is thus secured by the sudden exposure to the full heat of the oven at the outset, permits the retention of the maximum amount of moisture in the loaf during the subsequent baking operation and prevents the gradual withdrawal of moisture which would occur if the loaf were caused to approach the hottest part of the oven by exposure to gradually increasing temperatures.

While I have herein shown and described a baking oven intended more particularly for utilization of hydrocarbon fuel, many features of my invention are applicable to ovens employing other fuels, and while I have described more specifically the operation of baking bread it is to be understood that the invention has application to widely different uses.

Moreover, while there is shown and described for the purpose of illustration one specific embodiment of the invention, it is to be understood that the same is not limited to the mechanical details or to the form or arrangement of parts, but that extensive deviations may be made therefrom without departing from the spirit thereof.

Claims:

1. A continuous baking oven comprising in combination, a baking chamber, an endless traveling conveyor with carrying devices for the materials to be baked, means to guide the conveyor into and through the chamber in an elongated path providing a plurality of up and down paths, a combustion chamber having refractory walls beneath the baking chamber, a hydrocarbon burner for said combustion chamber, a heating chamber between the combustion chamber and the baking chamber, a metallic radiating floor wall for the baking chamber exposed to the heating chamber, other metallic radiating walls extending between the up and down paths of travel of the conveyor and heated by the products of combustion passing through the heating chamber, said combustion chamber having a plurality of exits distributed lengthwise the same to distribute the products of combustion to the heating chamber and the said other radiating walls.

2. A continuous baking oven comprising in combination, a baking chamber and an endless conveyor for the materials to be baked, a combustion chamber with refractory walls beneath the baking chamber, and metallic radiating walls within the baking chamber heated by the products of combustion for the indirect heating of the material to be baked, and including a metallic radiating floor wall for the baking chamber.

3. A continuous baking oven comprising in combination, a baking chamber and an endless conveyor for the materials to be baked, a combustion chamber having refractory walls, a flue chamber communicating with the combustion chamber and having substantially horizontal metallic radiating walls heated by the products of combustion therein and exposed to the baking chamber, and additional flue chambers extending into the space of the baking chamber also having metallic radiating walls.

4. A baking oven having in combination, a baking chamber, an endless traveling conveyor for the materials to be baked, a combustion chamber provided with refractory walls, a flue chamber beneath the baking chamber communicating with the combustion chamber and having metallic radiating walls exposed to the baking chamber, and a plurality of flue chambers provided with metallic radiating walls extending through the space of the baking chamber and communicating with said first named flue chamber for conveying the products of combustion from the first flue chamber through a plurality of paths.

5. A continuous baking oven comprising a baking chamber, an endless conveyor with carrying devices for the materials to be baked, a combustion chamber beneath the baking chamber having refractory walls, a flue chamber over the combustion chamber, the bottom of the baking chamber including a metallic radiating wall heated by said flue chamber, and said combustion chamber having exits distributed lengthwise the same to distribute the products of combustion to said radiating walls.

6. A continuous baking oven comprising in combination, a baking chamber separate from but communicating with the combustion chamber, an endless traveling conveyor, a combustion chamber, a heating chamber beneath the baking chamber, and a plurality of flues communicating with said heating chamber and having heat radiating walls exposed to the materials to be baked and presenting divided paths to the ascending products of combustion.

7. A baking oven having a baking chamber, a traveling conveyor, a metallic heat radiating floor for the baking oven, an arched combustion chamber with refractory walls, a heating or flue chamber between the combustion chamber and the radiating floor, a hydrocarbon burner for one end of the combustion chamber, the opposite end thereof being open to the heating chamber above, and intermediate exits from the combustion chamber to the heating chamber.

8. A continuous baking oven having a baking chamber, a traveling conveyor, a combustion chamber beneath the baking chamber, a flue chamber between the baking chamber and the combustion chamber having radiating walls exposed to the baking chamber, and exits to distribute the high temperature products of combustion to the flue chamber at different points lengthwise the baking chamber.

9. A continuous baking oven having a baking chamber, an endless traveling conveyor provided with carrying devices for the material to be baked, means for guiding the same into and out of said chamber near the bottom thereof, heat radiating surfaces within said baking chamber for the indirect heating of said baking chamber, said chamber having an entrance opening with a cooperating baffle wall within the chamber for protecting the carriers therein from the heat of the radiating surfaces until the carrier has reached the highly heated part of the oven, thereby to cause a sudden exposure of the carrier and its contents to the full heat of the oven.

10. A continuous baking oven having a baking chamber, means for heating the same, an endless traveling conveyor with carrying devices for the materials to be baked, upright entrance and exit passages for said conveyor opening to the exterior near the bottom and at the same side of the baking chamber, said carrying devices tending to close said passages against the exit of hot air or the entrance of cold air.

11. A continuous baking oven comprising in combination, a baking chamber, an endless conveyor for the materials to be baked, means for guiding the conveyor through said oven in a circuitous path, a combustion chamber having refractory walls beneath the baking chamber, a heating chamber between the combustion chamber and the baking chamber, and metallic radiating surfaces having an aggregate area greater than the area of the space occupied by the baking chamber and including a metallic bottom wall for the baking chamber exposed to the heat of said heating chamber.

12. A continuous baking oven having a baking chamber, a traveling conveyor, a combustion chamber beneath the oven provided with arched refractory walls, a radiating floor surface for the baking chamber, and lateral exit ports for said combustion chamber intermediate its ends presenting a greater cross-sectional area at the side of the arch for the discharge of the gases than at the top thereof.

13. A continuous baking oven comprising in combination a baking chamber, means for heating the same, a flexible traveling conveyor having a series of carriers pivotally suspended thereon, trays on said carriers, a series of pans on each tray, and devices to automatically discharge the baked materials comprising a movable device in each pan to dislodge the baked materials in the pan, means to actuate the same, and means acting cooperatively to tilt the pan with relation to the conveyor.

14. A continuous baking oven comprising in combination a baking chamber, means for heating the same, a flexible traveling conveyor having a series of carriers pivotally suspended thereon and normally held by gravity in all positions of the conveyor, each on its pivotal support in depending relation to said conveyor, means automatically to tilt the carrier out of its gravity suspended position, and a movable dislodging device coordinately actuated to dislodge the baked material from its carrier.

15. A continuous baking oven comprising in combination a baking chamber, a traveling conveyor for the materials to be baked, means to guide said carrier through said chamber in a succession of up and down paths providing a plurality of reverse turns with spaces between resulting counterpaths of the conveyor, alternate spaces being unobstructed at the bottom, and a plurality of upright flue chambers extending into the baking chamber in said alternate unobstructed spaces and provided with radiating surfaces adapted to be heated by the ascending products of combustion.

16. A continuous baking oven comprising in combination a baking chamber, a traveling conveyor for the materials to be baked, means to guide said carrier through said chamber in a succession of up and down paths providing a plurality of reverse turns with spaces between resulting counterpaths of the conveyor, alternate spaces being unobstructed at the bottom, a radiating bottom wall for said baking chamber, and a plurality of upright flue chambers extending from the bottom wall into the baking chamber in said alternate unobstructed spaces and provided with radiating surfaces adapted to be heated by the ascending products of combustion.

17. A continuous baking oven comprising in combination a baking chamber, a traveling conveyor for the materials to be baked, means to guide said carrier through said chamber in a succession of up and down paths providing a plurality of reverse turns with spaces between resulting counterpaths of the conveyor, alternate spaces being unobstructed at the bottom, a radiating bottom wall for said baking chamber with a heating space below the same, a plurality of upright flue chambers extending into the baking chamber in said alternate unobstructed spaces and provided with radiating surfaces adapted to be heated by the products of combustion ascending from said heating space, and a separate heat distributing chamber provided with refractory walls beneath said heating space.

18. A continuous baking oven comprising a baking chamber, a combustion chamber, a traveling conveyor having an elongated path presenting substantially parallel portions within the baking chamber, heating devices comprising substantially parallel radiating plates extending transversely the baking chamber and between parallel portions of said conveyor's path, said plates forming between them a flue chamber through which the products of combustion are adapted to pass, and means within said chamber to distribute the products of combustion over the surfaces of said plates.

19. A continuous baking oven comprising in combination, a baking chamber, an endless traveling conveyor with carrying devices for the materials to be baked, means to guide said conveyor in said chamber through a circuitous path providing alternately up and down paths, a heating chamber beneath said baking chamber and separated therefrom by a metallic heat radiating wall, and one or more flue chambers with heat radiating walls extending upward from said heating chamber between successive up and down paths of the conveyor.

20. A continuous baking oven having a baking chamber, a radiating bottom wall for said chamber, an endless conveyor having carriers with means to guide the same into and out of the baking chamber at the same end and near the bottom thereof, said chamber having provision to oppose the escape of heat radiated from said floor and the entrance of cold air with the exit and entrance of the carriers.

21. A continuous baking oven having a substantially enclosed baking chamber, heating means, an endless conveyor with carriers and devices to guide the same into and out of the chamber, said guiding devices providing for the entrance and exit of said carriers beyond the peripheral limits of the baking chamber in horizontal paths near the bottom and at the same end of the chamber but having their succeeding and preceding movements respectively in substantially vertical paths.

22. A baking oven having a baking chamber, a traveling conveyor, extended radiating surfaces in the baking chamber for the indirect heating thereof and including an underlying radiating floor, distributed flue exits to withdraw the heated gases from said floor and assist in the diffusion thereof over the floor, said flue exits also presenting radiating surfaces exposed to the baking chamber, and a combustion chamber having refractory walls beneath the floor and provided with means to distribute the gases to the floor through multiple paths to diffuse the same over the floor.

23. A baking oven having a baking chamber, a traveling conveyor, radiating surfaces exposed to the interior of said chamber for the indirect heating thereof comprising extended radiating walls underlying said conveyor, a heat distributing chamber having refractory walls underlying the baking chamber, and means for distributing the heated gases from the chamber to the underlying radiating walls to cause the diffusion of the heated gases over the same.

24. A baking oven having a baking chamber, a traveling conveyor, radiating surfaces exposed to the interior of said chamber for the indirect heating thereof and comprising a radiating floor wall, a heating space beneath the floor wall, and a heat distributing chamber having means for distributing the heated gases from the chamber to the heating space to cause a diffusion of the heated gases over the floor wall.

25. In a continuous baking oven, the combination with a baking chamber of a conveyor for the materials to be baked, means for guiding the same through the chamber in an elongated path exposing to the heat of the chamber a length of conveyor relatively great as compared with the length of the chamber, a radiating floor underlying the conveyor and so related to the capacity of the conveyor as to provide heat proportioned to the materials conveyed through the chamber, a chamber having refractory walls beneath the floor and separated therefrom by a heating space, means for diffusing and distributing the products of combustion to the heating space and the floor, and means at the margin of the floor for carrying off the products of combustion.

26. A baking oven having in combination a baking chamber, an endless traveling conveyor for the materials to be baked, means for guiding the same through the chamber in an elongated path exposing to the heat of the chamber a length of conveyor relatively great as compared with the length of the chamber, a combustion chamber provided with refractory walls, a flue chamber having radiating walls underlying the conveyor and exposed to the baking chamber and communicating with the combustion chamber by means which provide for diffusion of the gases over the radiating walls, said walls being so related to the capacity of the conveyor as to provide heat proportioned to the materials conveyed through the chamber, and a plurality of exit flue chambers having radiating walls exposed to the baking chamber and providing for further diffusion of the heated gases over the underlying radiating walls.

27. A baking oven having a baking chamber, a traveling conveyor, means for guiding the same through the chamber in an elongated path exposing to the heat of the chamber a length of conveyor relatively great as compared with the length of the chamber, a heat distributing chamber through which the products of combustion pass, radiating surfaces underlying the conveyor for indirectly heating the baking chamber, said surfaces being so related to the capacity of the conveyor as to provide heat proportioned to the materials conveyed through the chamber, and exits distributed lengthwise the distributing chamber to distribute the high temperature products of combustion to the radiating surfaces at different points thereon.

28. A continuous baking oven having in combination a baking chamber, an endless conveyor for the materials to be baked, means for guiding the conveyor through the chamber in an elongated path exposing to the heat of the chamber a length of conveyor relatively great as compared with the length of the chamber, a combustion chamber having refractory walls beneath the baking chamber, radiating surfaces for the baking chamber having an aggregate area greater than the area of the space occupied by the baking chamber and comprising radiating walls underlying the conveyor, said surfaces being so related to the capacity of the conveyor as to provide heat proportioned to the materials conveyed through the chamber, and means to distribute the heated gases from the combustion chamber to the underlying radiating walls through multiple paths to diffuse the gases over the same.

29. A continuous baking oven having in combination a baking chamber, a traveling conveyor, means for guiding the same through the chamber in an elongated path exposing to the heat of the chamber a length of conveyor relatively great as compared with the length of the chamber, an underlying flue chamber with radiating walls so related to the capacity of the conveyor as to provide heat proportioned to the materials conveyed through the chamber, said chamber also having a plurality of flue exits to provide divided paths and diffusion of the gases over the radiating walls, and a separate heat distributing chamber with means to distribute the gases to the flue chamber through multiple paths to further diffuse the same over said underlying radiating walls.

30. A continuous baking oven comprising in combination a baking chamber, the conveyor 23 with trays 27, means for guiding the same through the chamber in an elongated path exposing to the heat of the chamber a length of conveyor relatively great as compared with the length of the chamber, the radiating surfaces comprising the floor 21, said surfaces being so related to the capacity of the conveyor as to provide heat proportioned to the materials conveyed through the chamber, the underlying heating chamber 45, the combustion chamber 35 with its walls 37, the distributing openings 71, and the burner 39.

In testimony whereof, I have signed my name to this specification.

ARTHUR H. BALLARD.

Certificate of Correction.

It is hereby certified that in Letters Patent No. 1,434,035, granted October 31, 1922, upon the application of Arthur H. Ballard, of Boston, Massachusetts, for an improvement in "Apparatus for Baking," an error appears in the printed specification requiring correction as follows: Page 6, lines 129 and 130, and page 7, line 1, claim 6, strike out the words "separate from but communicating with the combustion chamber," and insert the same to follow the word "chamber" in line 3, page 7, same claim; and that the said Letters Patent should be read with this correction therein that the same may conform to the record of the case in the Patent Office.

Signed and sealed this 28th day of November, A. D., 1922.

[SEAL.] KARL FENNING,
*Acting Commissioner of Patents.*